(12) United States Patent
Wu et al.

(10) Patent No.: US 12,312,160 B2
(45) Date of Patent: May 27, 2025

(54) CONTAINER EQUIPMENT AND METHOD FOR ENCLOSED TRANSPORTATION AND HETEROTOPIC AND AEROBIC STABILIZATION OF RESERVED GARBAGE (71) Applicants: NANJING UNIVERSITY, Jiangsu (CN); NANJING CROSS ENVIRONMENTAL TECHNOLOGY CO., LTD., Jiangsu (CN)

(72) Inventors: Jun Wu, Jiangsu (CN); Yifan Chen, Jiangsu (CN); Zhouzhi Pan, Jiangsu (CN); Yilian Lv, Jiangsu (CN); Haitao Ma, Jiangsu (CN); Junwei Zhu, Jiangsu (CN); Zhili Yang, Jiangsu (CN); Pinghai Li, Jiangsu (CN); Wangfeng Xue, Jiangsu (CN)

(73) Assignees: NANJING UNIVERSITY, Jiangsu (CN); NANJING CROSS ENVIRONMENTAL TECHNOLOGY CO., LTD., Jiangsu (CN)

( * ) Notice: Subject to any disclaimer, the term of this patent is extended or adjusted under 35 U.S.C. 154(b) by 93 days.

(21) Appl. No.: 18/558,030

(22) PCT Filed: Apr. 28, 2022

(86) PCT No.: PCT/CN2022/089710
§ 371 (c)(1),
(2) Date: Oct. 30, 2023

(87) PCT Pub. No.: WO2022/233259
PCT Pub. Date: Nov. 10, 2022

(65) Prior Publication Data
US 2024/0140699 A1    May 2, 2024

(30) Foreign Application Priority Data

May 6, 2021  (CN) .......................... 202110488712.2

(51) Int. Cl.
*B65D 88/74* (2006.01)
*B65D 90/04* (2006.01)

(52) U.S. Cl.
CPC ......... *B65D 88/744* (2013.01); *B65D 88/745* (2013.01); *B65D 88/747* (2013.01); *B65D 90/04* (2013.01)

(58) Field of Classification Search
CPC .. B65D 88/744; B65D 88/745; B65D 88/747; B65D 90/04; B65D 90/02; B65D 90/00; B09B 3/40
See application file for complete search history.

(56) References Cited

FOREIGN PATENT DOCUMENTS

| AU | 1245500 A | 7/2001 |
|---|---|---|
| CH | 587389 A5 | 4/1977 |

(Continued)

*Primary Examiner* — Andrew D Perreault
(74) *Attorney, Agent, or Firm* — MUNCY, GEISSLER, OLDS & LOWE, P.C.

(57) ABSTRACT

The present invention discloses a container equipment for enclosed transportation and heterotopic and aerobic stabilization of reserved garbage, which includes a container body and a functional lining provided on an inner wall of the container body, wherein the functional lining is provided with a circulating air low-temperature evaporation system, a water distribution and drainage system and a heating and insulating system; the circulating air low-temperature evaporation system includes an air inlet manifold, an air distribution perforated pipe, a base plate water discharge and air distribution groove and a top plate water distribution and air guide groove, an air extraction perforated pipe, a fan, an air outlet pipe and a quicklime dehydration and deodorization system; the water distribution and drainage system includes a percolate feeding pipe, a fiber capillary water distribution pipe, the top plate water distribution and air guide groove, a side drain, a main drain and a percolate discharge pipe; the heating and insulating system includes a (Continued)

base plate hydrothermal manifold, a bottom hydrothermal coil, a peripheral hydrothermal layer, a bottom air insulating layer and a peripheral air insulating layer. The present invention also discloses a method for using the container equipment described above. The present invention achieves a fully-enclosed transportation of solid waste and a heterotopic and aerobic stabilization process.

10 Claims, 5 Drawing Sheets

(56) References Cited

FOREIGN PATENT DOCUMENTS

| | | | |
|---|---|---|---|
| CN | 105084966 | A | 11/2015 |
| CN | 107601725 | A | 1/2018 |
| CN | 109772864 | A | 5/2019 |
| CN | 210885478 | U | 6/2020 |
| CN | 111468518 | A | 7/2020 |
| CN | 111570467 | A | 8/2020 |
| CN | 212387979 | U | 1/2021 |
| CN | 112707606 | A | 4/2021 |
| CN | 112717666 | A | 4/2021 |
| CN | 113233028 | A | 8/2021 |
| JP | 2009050836 | A | 3/2009 |

CONTAINER EQUIPMENT AND METHOD FOR ENCLOSED TRANSPORTATION AND HETEROTOPIC AND AEROBIC STABILIZATION OF RESERVED GARBAGE

TECHNICAL FIELD

The present invention relates to the technical field of heterotopic and aerobic stabilization of reserved garbage, and in particular to a container equipment and method for enclosed transportation and heterotopic and aerobic stabilization of reserved garbage.

BACKGROUND ART

The reserved garbage refers to household waste which has been treated by means of landfill and has been stably treated in landfill for a long time. According to the situation of urban environmental sanitation in "China Urban and Rural Construction Statistical Yearbook", the total amount of urban household waste removal and transportation in China in 2018 reached 228.0175 million tons, and the total amount of treatment reached 226.8475 million tons, among which the sanitary landfill reached 117.0602 million tons. Therefore, landfill is still a main way of household waste treatment in China. At present, in the whole country, approximately 8 billion tons of reserved garbage is reserved in informal landfills (27, 000) and sanitary landfills (1600), which occupy about 500 million $m^2$ and contain about 3.5 billion tons of aged organic matter, 1.5 billion tons of plastic, 1 billion tons of fabric and 500 million tons of inorganic inerts. The potential resources are huge, but the pollution is serious. Therefore, the harmless disposal, resource conversion and secondary pollution control of informal landfills and sanitary landfills have important theoretical and practical significance for responding to public concerns, recycling resources, making full use of land, treating existing informal landfills or dumps and recycling sanitary landfills.

At present, the methods of reserved garbage landfill are divided into in-situ treatment and heterotopic treatment. The in-situ treatment technology is to make the garbage pile in a quasi-aerobic environment by forced air, percolate nutrition allocation and injection and recharge. The degradation rate of organic waste increases rapidly, but the stabilization takes a long time (1-3 years), which cannot meet the urgent needs of land replacement, and there are some problems, such as high investment and operating costs, easy to affect the surrounding environment and the like. In order to solve the problems of the in-situ aerobic stabilization technology, the heterotopic and aerobic stabilization technology springs up. The heterotopic treatment has the advantages of rapid release of land space, material recovery and resource utilization through the mining and screening of garbage, and can also avoid the landfill due to the continuous production of percolate resulting in late maintenance and management costs.

However, at present, the heterotopic treatment technology of household reserved garbage is still mainly based on other industries such as mining industry, the garbage is excavated outdoor and transported without being covered to an open field for air drying, and is screened after the water content decreases. However, compared with the stable ore, the reserved garbage which has not been stabilized is easy to produce percolate and malodorous gas, if it is still subjected to extensive mining, transportation and storage technology of mining industry, it will inevitably cause secondary pollution to the surrounding environment in the treatment process; at the same time, the air drying effect of the garbage pile is restricted by weather conditions and air humidity, and often only the moisture content in the surface layer decreases, while there is still a high moisture content in the pile and it is in an anoxic environment, which affects the subsequent screening and recycling effect.

Publication No. CN 111570467A discloses a reserved household waste heterotopic and aerobic strengthening stabilization system and method, which can achieve efficient control of the water content of the reserved garbage, accelerate the process of aerobic stabilization, and simultaneously achieve the prevention and control of secondary pollution by constructing an excavated garbage reservation site within one week. However, this technology needs to set up an additional fixed bed, due to a limited pile height of fixed bed (generally no more than 2 m), the fixed bed needs to occupy a large area, which is greatly affected by the terrain. In addition, the fixed bed also has the problems of long construction period, large investment amount, and difficult to recycle after the completion of landfill treatment. At the same time, the secondary pollution control of percolate and malodorous gas in the transportation process from the landfill to the fixed bed also needs to be solved.

The container equipment can be used to replace the traditional fixed bed for its standardization, easy management, piling to reduce floor space, flexible transportation and re-usability. However, due to the fact that forced ventilation should be performed in a totally closed environment and a constant suitable temperature should be maintained in the process of the stabilization of the reserved garbage and the leached percolate may cause corrosion to the container body, it is necessary to install a special functional lining in the container to bear the excavated and mined garbage, and provide a closed environment to achieve the functions of forced ventilation, percolate collection and recharging, heat supply and thermal insulation, etc. The existing container linings are mainly used for thermal insulation, which cannot fully achieve the above-mentioned functions, and the structural strength and installation accuracy cannot meet the requirements.

SUMMARY OF THE INVENTION

In view of the fact that the existing heterotopic and aerobic stabilization technology of reserved garbage is still based on engineering construction, and the existing problems such as long construction period, large investment cost, large floor space and difficulty in reuse exist in the construction site, an object of the present invention is to design a container equipment for enclosed transportation and heterotopic and aerobic stabilization of reserved garbage to replace the traditional fixed bed structure, and to realize the fully enclosed transportation and heterotopic and aerobic stabilization process of solid waste by combining the "three-in-one" secondary pollution control and low-temperature evaporation water content control heterotopic stabilization technology for solid waste, percolate and malodorous gas.

In order to solve the above-mentioned problem, the technical solution used by the present invention is as follows:

A container equipment for enclosed transportation and heterotopic and aerobic stabilization of reserved garbage, which comprises a container body and a functional lining provided on an inner wall of the container body, and the functional lining is provided with a circulating air low-temperature evaporation system and a water distribution and drainage system; the circulating air low-temperature evaporation system comprises an air inlet manifold, an air distribution perforated pipe, a base plate water discharge and air distribution groove and a top plate water distribution and air guide groove, an air extraction perforated pipe, a fan, an air outlet pipe and a quicklime dehydration and deodorization system; the air inlet manifold is connected to the quicklime dehydration and deodorization system, and the air distribution perforated pipe is connected to the air inlet manifold and is arranged in an equidistantly distributed base plate water discharge and air distribution groove to distribute air from bottom to top; the air extraction perforated pipe is provided below the top plate water distribution and air guide groove, the air extraction perforated pipe is connected to an air inlet of the fan, an air outlet of the fan is connected to an air outlet pipe, and the air outlet pipe is connected to the quicklime dehydration and deodorization system; the water distribution and drainage system comprises a percolate feeding pipe, a fiber capillary water distribution pipe, the top plate water distribution and air guide groove, a side drain, a main drain and a percolate discharge pipe; a fiber capillary water distribution pipe is arranged in the top plate water distribution and air guide groove and is connected to a percolate feeding pipe, and uniformly distributes water from top to bottom towards the filler; the side drain and the main drain located on the base plate of the functional lining are all connected to the percolate discharge pipe to drain the waste water from the percolate discharge pipe.

Further, the functional lining further comprises a heating and insulating system comprising a base plate hydrothermal manifold, a bottom hydrothermal coil, a peripheral hydrothermal layer, a bottom air insulating layer and a peripheral air insulating layer; the peripheral hydrothermal layer comprises a hydrothermal short tube at a side of the base plate, a side hydrothermal layer at two side plates and a top hydrothermal layer at the top plate; the base plate hydrothermal manifold is connected to the quicklime dehydration and deodorization system via a circulating water pipe to respectively deliver hot circulating water produced thereby to the bottom hydrothermal coil and the above-mentioned outer peripheral hydrothermal layer to supply heat for the filler inside the inner liner, and deliver the circulated water to the quicklime dehydration and deodorization system to raise the temperature with the residual heat of the system; the peripheral air insulating layer comprises a side air layer of the base plate, a side air layer of the side plates on two sides, a top air layer of the top plate, and the peripheral air insulating layer together with the bottom air insulating layer prevents the heat inside the lining from escaping.

Further, the container equipment may be piled on top of each other.

Further, wherein the functional lining comprises a side plate, a top plate, a base plate and a back plate spliced together; the base plate is molded from waste plastic and the side plate, the top plate and the back plate are extrusion-molded.

Further, the equipment further comprises a positioning and fixing system comprising side positioning squares and a positioning and fixing device, wherein either end of the side positioning square is provided on a side wall of the container body and are of the same length as the container body, for positioning the inner lining in the width direction of the interior of the container; the positioning and fixing device is located between the inner wall of the top of the container body and the top plate of the functional lining and is connected to a stressed frame of the container body for positioning and fixing the top plate of the functional lining at the height and depth inside the container.

Further, the positioning and fixing device comprises a winch lifting device, a steel beam and a fixed square, the height of the steel beam is a distance from the top plate of the functional lining to the top of the inner side of the container, a plurality of lower recesses are provided below the steel beam and along the length direction of the steel beam, and the lower recesses are located correspondingly to the top plate upper recesses of the functional lining; the fixed square is provided in the lower recess, and the top of the fixed square is connected to the winch lifting device inside the steel beam via a steel wire rope to achieve the lifting of the fixed square between the lower recess and the top plate upper recess; the height of the fixed square should be greater than the depth of the top plate upper recess and less than the height of the steel beam. A method for using a container equipment for enclosed transportation and heterotopic and aerobic stabilization of reserved garbage, which comprises:

after filling the functional inner liner with the excavated garbage to ensure that the garbage is performed enclosed transportation to a heterotopic and aerobic stabilizing area with the container equipment gate being airtight, connecting an air inlet manifold, an air outlet pipe and a base plate hydrothermal manifold to a quicklime dehydration and deodorization system, connecting a percolate feeding pipe and a percolate discharge pipe to a percolate treatment system to perform an aerobic stabilization process of a single container equipment, controlling the temperature inside the container by adjusting the circulating air and circulating water temperatures of the quicklime dehydration and deodorization system, maintaining a suitable moisture content of the excavated garbage by adjusting a water distribution speed and fully closing the whole process; and transporting the container equipment to a designated area to be emptied after the excavated garbage reach an aerobic stabilization standard, and then transporting the container equipment to a landfill to load newly excavated garbage.

Further, the hot dry air supplied from the quicklime dehydration and deodorization system enters an air distribution perforated pipe through an air inlet manifold, and uniformly distributes the air from the bottom to the top toward the functional lining; after the filler fills the functional lining, the wet circulating air formed by taking away the moisture in the filling is pumped into an air extraction perforated pipe through a flow guiding function of the top plate water distribution and air guide groove, and enters the quicklime dehydration and deodorization system through the air outlet pipe to remove malodorous gas and water vapor therein to obtain dry hot air, and then enters the container from the air inlet manifold at the bottom to form the circulating air to reduce the moisture content of the garbage.

Further, the percolate inlet pipe evenly distributes the inlet water from top to bottom to the filler via a fiber capillary water distribution pipe; the percolate discharge pipe drains an effluent produced by the filler in the heterotopic aerobic stabilization process by means of a guide and drain function of a side drain and a main drain.

Further, a temperature of the excavated garbage in the container equipment is 25-50° C. and a water content is kept between 40-50% for an aerobic stabilization process; the aerobic stabilization standard is that the moisture content of an excavated sample is less than 40%, a 4-day respiratory intensity $AT_4$ is less than 5 mg $O_2$/g DW, and the stabilization time is generally 3-7 days.

Advantageous effects of the present invention are as follows:
(1) the equipment provides a suitable aerobic stable environment through the circulating air low-temperature evaporation system and the heating and insulating system, and achieves an effect of high-efficiency water content control; and the reserved excavated garbage can achieve rapid aerobic stability in 3-7 days, and greatly shorten the stabilization period;
(2) the equipment can effectively solve the problems of secondary pollution prevention and control of percolate and malodorous gas in transportation and aerobic stabilization in the heterotopic treatment of reserved garbage;
(3) the functional lining of the equipment can be manufactured from waste plastics by using a compression molding or extrusion molding technique to realize waste treatment and reduce the manufacturing cost while ensuring the use strength and requirements;
(4) the equipment can solve the problems of large area occupied by traditional fixed bed due to limited pile height and lack of construction conditions in some places by piling multiple containers, which is flexible and convenient to use, can be recycled in different projects in different places, and can significantly reduce project investment costs.

BRIEF DESCRIPTION OF THE DRAWINGS

FIG. 5 is a structural schematic view a winch lifting device of the positioning and fixing device.
1. container body; 2. functional lining; 3. positioning and fixing device; 4. control and maintenance area; 5. side positioning square; 6. side plate; 7. top plate; 8. base plate; 9. back plate; 10. vertical column; 11. cross beam; 12. air inlet manifold; 13. air distribution perforated pipe; 14. base plate water discharge and air distribution groove; 15 top plate water distribution and air guide groove; 16. air extraction perforated pipe; 17. fan; 18. air outlet pipe; 19. percolate feeding pipe; 20. fiber capillary water distribution pipe; 21. top plate upper recess; 22. side drain; 23. main drain; 24. percolate discharge pipe; 25. base plate hydrothermal manifold; 26. bottom hydrothermal coil; 27. peripheral hydrothermal layer; 28. bottom air insulating layer; 29. peripheral air insulating layer; 30. circulating water pipe; 31—steel beam, 32—fixed square, 33—lower recess, 34—steel wire rope, 35—top plate upper recess, 36—lifting controller, 37—fixed pulley.

DETAILED DESCRIPTION OF THE INVENTION

In order that the technical means, inventive features, objects and advantages achieved by the present invention will be readily apparent, a technical solution of an embodiment of the present invention will be clearly and completely described with reference to the accompanying drawings.

The container equipment for enclosed transportation and heterotopic and aerobic stabilization of reserved garbage of this embodiment comprises a container body 1, a functional lining 2, a positioning and fixing system, and a control and maintenance area 4. The functional lining 2 is formed by splicing a side plate 6, a top plate 7, a base plate 8 and a back plate 9, and comprises a circulating air low-temperature evaporation system, a water distribution and drainage system and a heating and insulating system.

Preferably, when a 20 or 40 inch standard container is used, the side plates 6 and the top plates 7 are engaged by means of vertical columns and cross beams.

The circulating air low-temperature evaporation system comprises an air inlet manifold 12, an air distribution perforated pipes 13, a base plate water discharge and air distribution groove 14, a top plate water distribution and air guide groove 15, an air extraction perforated pipe 16, a fan 17, an air outlet pipe 18, and a quicklime dehydration and deodorization system (the invention patent "a particle quicklime fixed bed dehydration and deodorization system and an operation method thereof", and the application number is 202011447631. X); the air inlet manifold 12 is arranged at the center of the base plate along the length direction of the base plate, an air distribution perforated pipe 13 is connected to the air inlet manifold 12 and is arranged in the base plate water discharge and air distribution groove 14 which is equidistantly distributed, and dry hot air provided by the quicklime dehydration and deodorization system enters the air distribution perforated pipes 13 equidistantly distributed via the air inlet manifold 12, and uniformly distributes air from bottom to top towards the functional lining. An air inlet of the fan 17 is connected to the air extraction perforated pipe 16, and an air outlet of the fan 17 is connected to the air outlet pipe 18. The air extraction perforated pipe 16 is provided at one side below the top plate water distribution and air guide groove 15, and an opening of the air extraction perforated pipe 16 corresponds to each water distribution and air guide groove 15; after the filler fills the functional lining, the wet circulating air formed by taking away the moisture in the filling is pumped into an air extraction perforated pipe 16 through a flow guiding function of the top plate water distribution and air guide groove 15, and enters the quicklime dehydration and deodorization system through the air outlet pipe 18 to remove malodorous gas and water vapor therein to obtain dry hot air, and then enters the container from the air inlet manifold 12 at the bottom to form the circulating air to reduce the moisture content of the garbage.

The water distribution and drainage system comprises a percolate feeding pipe 19 and a fiber capillary water distribution pipe 20 (patent for invention "FIBER CAPILLARY WATER DISTRIBUTION PIPE, WATER DISTRIBUTION SYSTEM AND WATER DISTRIBUTION METHOD", application number: 2020103619748), top plate water distribution and air guide groove 15, a side drain 22, a main drain 23 and a percolate discharge pipe 24; the percolate feeding pipe 19 is arranged below the top plate water distribution and air guide groove 15 and at the other side opposite to the air extraction perforated pipe 16; the fiber capillary water distribution pipe 20 is arranged in the top plate water distribution and air guide groove 15 which is equidistantly distributed, and is connected to the percolate feeding pipe 19, and the percolate feeding pipe 19 uniformly distributes water from top to bottom to the filler by the fiber capillary water distribution technology. The percolate discharge pipe 24 is connected to the main drain 23, and the percolate discharge pipe 24 drains an effluent produced by the filler in the heterotopic and aerobic stabilization process by means of a guide and drain function of a side drain 22 and a main drain 23.

Preferably, a mat is laid on top of the base plate loading area to prevent the load from falling into the base plate side drain 22 and the main drain 23.

The heating and insulating system comprises a base plate hydrothermal manifold 25, a bottom hydrothermal coil 26, a peripheral hydrothermal layer 27, a bottom air insulating layer 28, and a peripheral air insulating layer 29. The peripheral hydrothermal layer 27 is formed by splicing a hydrothermal short tube of the base plate 8, side hydrothermal layers of the two side plates 6, and a top hydrothermal layer of the top plate 7; the hydrothermal manifold 25 is connected to the quicklime dehydration and deodorization system via a circulating water pipe, and the hot circulating water produced thereby is respectively sent to the bottom hydrothermal coil 26 and the peripheral hydrothermal layer 27 to supply heat for the inner lining filling, and the circulated water is sent to the quicklime dehydration and deodorization system to be warmed using the residual heat of the system. The peripheral air insulating layer 29 is formed by splicing the side air layer of the base plate 8, the side air layers of the side plates 6, and the top air layer of the top plate 7, and together with the bottom air insulating layer 28, prevents the heat inside the lining from escaping to the environment to play a thermal insulation function.

Preferably, a right-angle stainless steel hollow corner code is placed at a splice of the hydrothermal layers of the side plates 6 and the top plate 7 to ensure the structural strength of the splice.

The positioning and fixing system comprises side positioning squares 5 and a positioning and fixing device 3. The side positioning square 5 is arranged inside the side walls of either side of the container, have the same width as the length of the side walls, and two side positioning squares are arranged equidistantly on each side, and are connected to a stressed frame of the container for positioning the liner in the width direction inside the container, and conducting the side pressure of the liner during transportation to the stressed frame of the container via the squares to prolong a service life of the liner; the positioning and fixing device 3 is installed on the top of the container and is connected with the stressed frame of the container, and is used for positioning and fixing the top plate 7 of the lining at the height and depth inside the container to prevent the displacement caused by the uphill and downhill during transportation.

Figure 1:
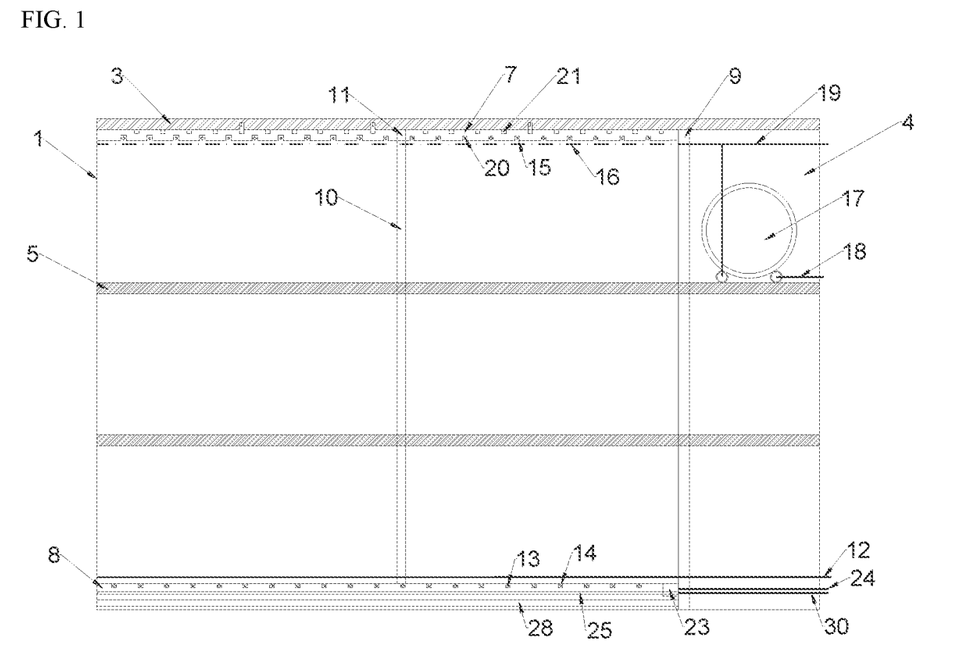
FIG. 1 is a front view according to the present invention.
Figure 2:
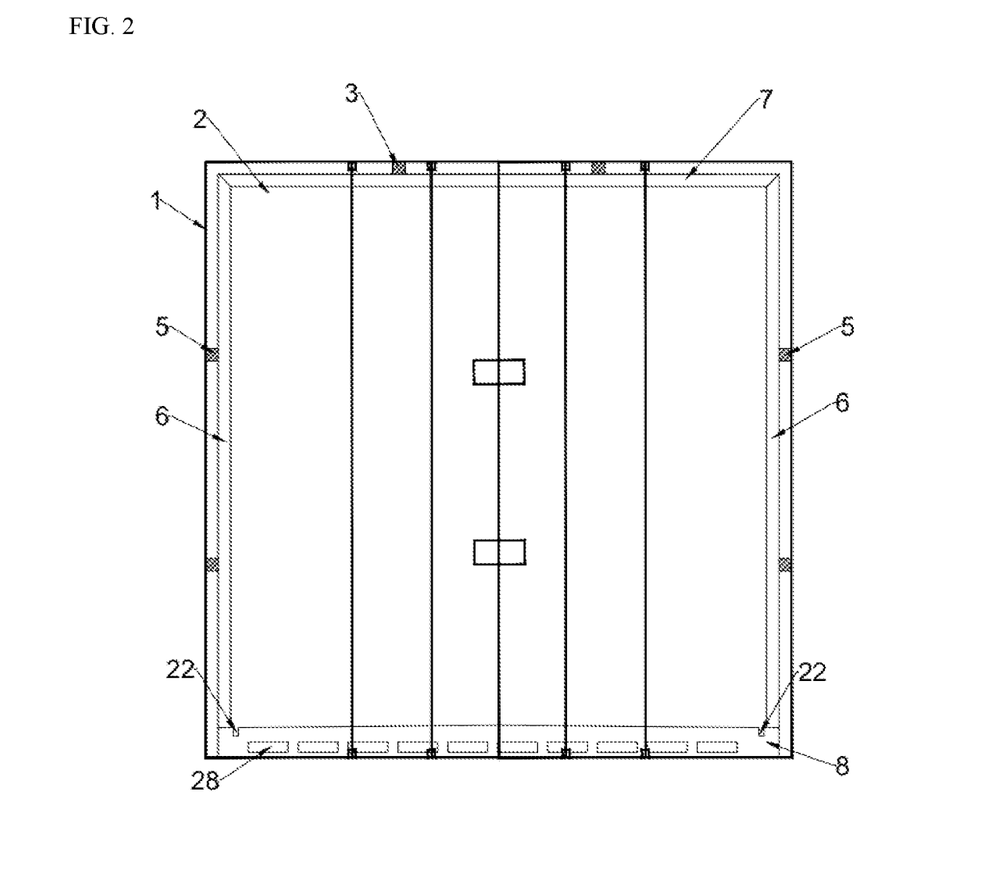
FIG. 2 is a left side view according to the present invention.
Figure 3:
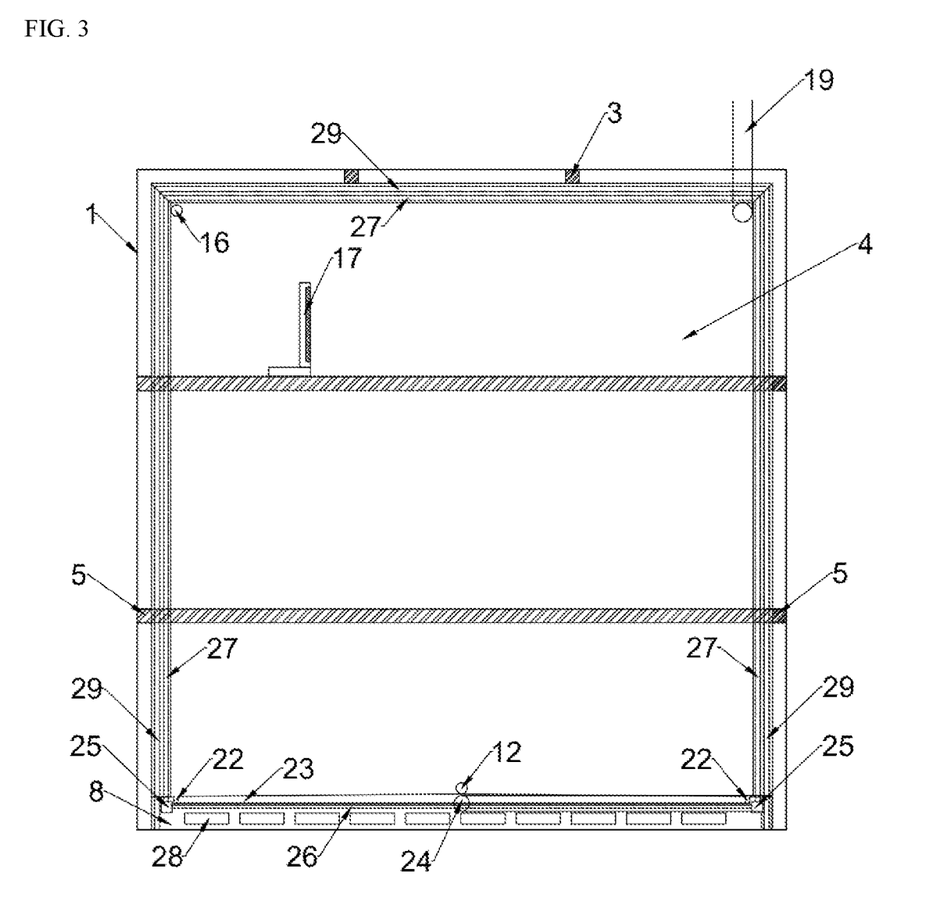
FIG. 3 is a right side view according to the present invention.
Figure 4:
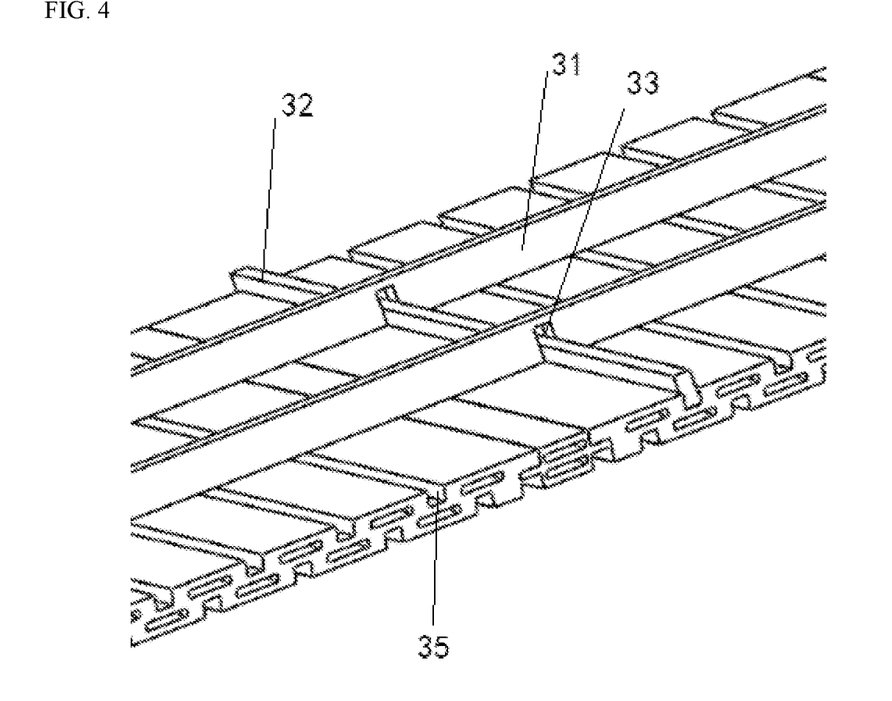
FIG. 4 is a schematic view of an assembled positioning and fixing device.
Figure 5:
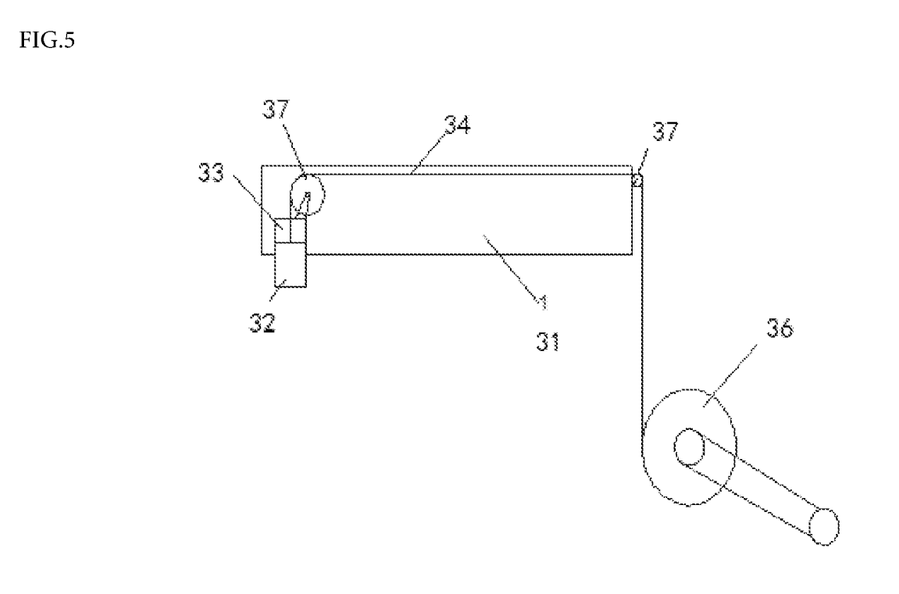

Specifically, as shown in FIGS. 4 and 5, the positioning and fixing device 3 is located between the top of the inner side of the container and the top plate 7 of the functional lining, and comprises a winch lifting device, a steel beam 31 and a fixed square 32, wherein the length of the steel beam 31 is the same as the length of the container, the height of the steel beam 31 is a distance from the top of the functional lining to the top of the container to position and fix the functional lining in an up-and-down direction, and several lower recess 33 are provided below the steel beam 31 and are arranged equidistantly along the length direction of the steel beam 31, and the positions of the lower recess 33 should correspond to the top plate upper recess 35 of the functional lining.

The winch lifting device comprises a steel wire rope 34, a lifting controller 36 and a fixed pulley 37, wherein the above-mentioned fixed square 32 is vertically arranged below the steel beam 31, and specifically, the fixed square 32 is arranged in a lower recess 33, the top of the fixed square 32 passes through two fixed pulleys 37 in the steel beam 31 via the steel wire rope 34 and is connected to the lifting controller 36 (as shown in FIG. 5), and the steel wire rope 34 is retracted and released by the lifting controller 36 to achieve the lifting of the fixed square 32 between the steel beam lower recess 33 and the inner lining top plate upper recess 35.

The height of the fixed square 32 should be greater than the depth of the lining top plate upper groove 35 and less than the height of the steel beam 31, so that the fixed square 32 can be completely retracted into the steel beam lower recess 33 before the lining is assembled, and still partially located in the steel beam lower recess 33 when the fixed square 2 is completely lowered into the lining top plate upper groove 35 after the lining is assembled to realize the positioning and fixing of the lining in the front-rear direction and a better transmission and stress effect.

Preferably, the side positioning square 5 has a width of 25-80 mm and a height of 25-80 mm, and can be made of recycled plastics.

A control and maintenance area 4 is provided in an interlayer area between the rear part of the container and the functional lining back plate, and is provided with a steel platform for placing a fan 17 required by the circulating air low-temperature evaporation system; and the control and maintenance area 4 further comprises a part of an air inlet manifold 12, a percolate feeding pipe 19, an air outlet pipe 18 and a percolate discharge pipe 24 to facilitate the connection and routine maintenance of pipelines when multiple groups of container equipment are used in combination.

Preferably, a double door is mounted on a container head, and a rubber sealing ring is provided at a joint between an inner side of the door and the inner lining to play a sealing function; an access is provided at the rear of the container to facilitate operators to enter the control and maintenance area 4.

The back plate 9 is a plate that achieves the entire liner seal without process piping and other special effects. The back plate is attached to the base plate 8, the side plate 6 and the top plate 7 on an opposite side to the double door.

The method for using the above-mentioned container equipment for enclosed transportation and heterotopic and aerobic stabilization of reserved garbage comprises the following steps:

S1: when excavating the reserved garbage in the landfill, a side of the container equipment head gate is raised under the action of an external force, and the excavator directly loads the excavated garbage into the container to reduce an exposure time of the excavated garbage;

S2: when the excavated garbage falling into the container fills the entire functional lining under the action of gravity, the container equipment returns to its original state, ensuring that the gate is directly sent to the heterotopic and aerobic stabilizing area after being closed, and secondary pollution control is achieved by enclosed transportation;

S3: after the container arrives at the designated area, the air inlet manifold 12, the air outlet pipe 18 and the hydrothermal manifold 25 are connected to the quicklime dehydration and deodorization system, the percolate feeding pipe 19 and the percolate discharge pipe 24 are connected to the percolate treatment system for the aerobic stabilization process of a single container equipment, the temperature inside the container is controlled by adjusting the circulating air and circulating water temperatures of the quicklime dehydration and deodorization system, and a suitable moisture content of the excavated garbage is maintained by adjusting the water distribution speed. The whole process is totally closed, which can effectively avoid secondary pollution of percolate and malodorous gas.

S4: after the excavated garbage reaches an aerobic stabilization standard, the container is transported to the designated area and the tail is raised; the stabilized excavated garbage flows out by gravity; and the emptied container can be transported to the landfill to fill the newly excavated garbage.

Preferably, an aerobic stabilization process is carried out by keeping the temperature of the excavated garbage in the container at 25-50° C. and the water content at 40-50%; the aerobic stabilization standard is that the water content of the pile (i.e. excavated garbage sample) is less than 40%, the 4-day respiratory intensity ($AT_4$) is less than 5 mg $O_2$/g DW, and the stabilization time is generally 3-7 days.

Embodiment 1

This embodiment provides a container equipment for enclosed transportation and heterotopic and aerobic stabilization of reserved garbage, and the container equipment has a size of 20 feet (generally referred to as the length of the container). The container equipment comprises a container body 1, a functional lining 2, a positioning and fixing system, and a control and maintenance area 4. The functional lining is formed by splicing two side plates 6 and a top plate 7 and a base plate 8 and a back plate 9, wherein the two side plates 6 and the top plate 7 are connected via a vertical column 10 and a cross beam 11, and the functional lining comprises a circulating air low-temperature evaporation system, a water distribution and drainage system and a heating and insulating system.

The circulating air low-temperature evaporation system consists of an air inlet manifold 12, an air distribution perforated pipes 13, a base plate water discharge and air distribution groove 14, a top plate water distribution and air guide groove 15, an air extraction perforated pipe 16, a fan 17, an air outlet pipe 18, and a quicklime dehydration and deodorization system (the invention patent "a particle quicklime fixed bed dehydration and deodorization system and an operation method thereof", and the application number is 202011447631. X); an air distribution perforated pipe 13 is connected to the air inlet manifold 12 and is arranged in the base plate water discharge and air distribution groove 14 which is equidistantly distributed by 30 mm, and dry hot air provided by the quicklime dehydration and deodorization system enters the air distribution perforated pipes 13 via the air inlet manifold 12, and uniformly distributes air from bottom to top towards the functional lining; an air inlet of the fan 17 is connected to the air extraction perforated pipe 16, and an air outlet of the fan 17 is connected to the air outlet pipe 18. The air extraction perforated pipe 16 is provided at one side below the top plate water distribution and air guide groove 15, and an opening of the air extraction perforated pipe 16 corresponds to each water distribution and air guide groove 15; after the filler fills the functional lining, the wet circulating air formed by taking away the moisture in the filling is pumped into an air extraction perforated pipe 16 through a flow guiding function of the top plate water distribution and air guide groove 15, and enters the quicklime dehydration and deodorization system through the air outlet pipe 18 to remove malodorous gas and water vapor therein to obtain dry hot air, and then enters the container from the air inlet manifold 12 at the bottom to form the circulating air to reduce the moisture content of the garbage.

The water distribution and drainage system comprises a percolate feeding pipe 19 and a fiber capillary water distribution pipe 20 (patent for invention "FIBER CAPILLARY WATER DISTRIBUTION PIPE, WATER DISTRIBUTION SYSTEM AND WATER DISTRIBUTION METHOD", application number: 2020103619748), top plate water distribution and air guide groove 15, a side drain 22, a main drain 23 and a percolate discharge pipe 24; the percolate feeding pipe 19 is arranged below the top plate water distribution and air guide groove 15 and at the other side opposite to the air extraction perforated pipe 16; the fiber capillary water distribution pipe 20 is arranged in the top plate water distribution and air guide groove 15 which is equidistantly distributed by 30 mm, and is connected to the percolate feeding pipe 19, and the percolate feeding pipe 19 uniformly distributes water from top to bottom to the filler by the fiber capillary water distribution technology. The percolate discharge pipe 24 is connected to the main drain 23, and the percolate discharge pipe 24 drains an effluent produced by the filler in the heterotopic and aerobic stabilization process by means of a guide and drain function of a water discharge and air distribution groove (side drain 22) and a main drain 23. A mat is laid on top of the base plate loading area to prevent the load from falling into the base plate water discharge and air distribution groove (side drain 22) and the main drain 23.

The heating and insulating system comprises a base plate hydrothermal manifold 25, a bottom hydrothermal coil 26, a peripheral hydrothermal layer 27, a bottom air insulating layer 28, and a peripheral air insulating layer 29. The peripheral hydrothermal layer 27 is formed by splicing a hydrothermal short tube (an area located at either side of the base plate 8 and connected with the side plate 6) of the base plate, side hydrothermal layers of the two side plates 6, and a top hydrothermal layer of the top plate 7; the hydrothermal manifold 25 is connected to the quicklime dehydration and deodorization system via a circulating water pipe 30, and the hot circulating water produced thereby is respectively sent to the bottom hydrothermal coil 26 and the above peripheral hydrothermal layer 27 to supply heat for the inner lining filling, and the circulated water is sent to the quicklime dehydration and deodorization system to be warmed using the residual heat of the system. The peripheral air insulating layer 29 is formed by splicing the side air layer of the base plate, the side air layers of the side plates, and the top air layer of the top plate, and together with the bottom air insulating layer 28, prevents the heat inside the lining from escaping to the environment to play a thermal insulation function. In addition, a right-angle stainless steel hollow corner block is placed at a splice between the side plate and the top plate to ensure the structural strength of the splice.

The positioning and fixing system comprises side positioning squares 5 and a positioning and fixing device 3. The side positioning squares 5 are provided inside the side walls of either side of the container, and have a width and height of 50 mm, and a length of 5898 mm, which is the same as the length of the side walls, and two side positioning squares are arranged equidistantly on each side, and are connected to a stressed frame of the container for positioning the liner in the width direction inside the container, and conducting the side pressure of the liner during transportation to the stressed frame of the container via the side squares 5 to prolong a service life of the liner; the positioning and fixing device 3 is installed on the top of the container and is connected with the stressed frame of the container, and is used for positioning and fixing the top plate 7 of the lining at the height and depth inside the container to prevent the displacement caused by the uphill and downhill during transportation.

A control and maintenance area 4 is provided in an interlayer area between the rear part of the container and the functional lining back plate, and is provided with a steel platform for placing a fan 17 required by the circulating air low-temperature evaporation system; and the control and maintenance area further comprises a part of an air inlet manifold 12, a percolate feeding pipe 19, an air outlet pipe 18 and a percolate discharge pipe 24 to facilitate the connection and routine maintenance of pipelines when multiple groups of container equipment are used in combination.

A double door is mounted on a container head, and a rubber sealing ring is provided at a joint between an inner side of the door and the inner lining to play a sealing function; an access is provided at the rear of the container to facilitate operators to enter the control and maintenance area 4.

The method for using the above-mentioned container equipment for enclosed transportation and heterotopic and aerobic stabilization of reserved garbage comprises the following steps:

S1: when excavating the reserved garbage in the landfill, a side of the container equipment is raised under the action of an external force, and the excavator directly loads the excavated garbage into the container to reduce an exposure time of the excavated garbage;

S2: when the excavated garbage falling into the container fills the entire functional lining under the action of gravity, the container equipment returns to its original state, ensuring that the gate is directly sent to the heterotopic and aerobic stabilizing area after being closed, and secondary pollution control is achieved by enclosed transportation;

S3: after the container arrives at the designated area, the air inlet manifold 12, the air outlet pipe 18 and the circulating water pipe 30 are connected to the quicklime dehydration and deodorization system, the percolate feeding pipe 19 and the percolate discharge pipe 24 are connected to the percolate treatment system for the aerobic stabilization process of a single container equipment, the temperature inside the container is controlled by adjusting the circulating air and circulating water temperatures of the quicklime dehydration and deodorization system, and maintaining a suitable moisture content of the excavated garbage by adjusting the water distribution so that the temperature of the excavated garbage in the container is 25-50° C. and the moisture content is maintained at 40-50% for the aerobic stabilization process. The whole process is totally closed, which effectively avoids secondary pollution of percolate and malodorous gas.

S4: after the excavated garbage reaches an aerobic stabilization standard, the container is transported to the designated area and the tail is raised; the stabilized excavated garbage flows out by gravity; and the emptied container can be transported to the landfill to fill the newly excavated garbage. The aerobic stabilization standard is that the water content of the pile (i.e. excavated garbage sample) is less than 40%, the 4-day respiratory intensity ($AT_4$) is less than 5 mg $O_2$/g DW, and the stabilization time is generally 5 days.

Embodiment 2

This embodiment provides a container equipment for enclosed transportation and heterotopic and aerobic stabilization of reserved garbage for 40 inch standard containers. The container equipment comprises a container body 1, a functional lining 2, a positioning and fixing system, and a control and maintenance area 4. The functional lining is formed by splicing four side plates 6 and a top plate 7 and a base plate 8 and a back plate 9, wherein every two side plates 6 and the top plate 7 are connected via a vertical column 10 and a cross beam 11, and the functional lining comprises a circulating air low-temperature evaporation system, a water distribution and drainage system and a heating and insulating system.

The circulating air low-temperature evaporation system consists of an air inlet manifold 12, an air distribution perforated pipes 13, a base plate water discharge and air distribution groove 14, a top plate water distribution and air guide groove 15, an air extraction perforated pipe 16, a fan 17, an air outlet pipe 18, and a quicklime dehydration and deodorization system (the invention patent "a particle quicklime fixed bed dehydration and deodorization system and an operation method thereof", and the application number is 202011447631. X); an air distribution perforated pipe 13 is connected to the air inlet manifold 12 and is arranged in the base plate water discharge and air distribution groove 14 which is equidistantly distributed by 30 mm, and dry hot air provided by the quicklime dehydration and deodorization system enters the air distribution perforated pipes 13 via the air inlet manifold 12, and uniformly distributes air from bottom to top towards the functional lining. An air inlet of the fan 17 is connected to the air extraction perforated pipe 16, and an air outlet of the fan 17 is connected to the air outlet pipe 18. The air extraction perforated pipe 16 is provided at one side below the top plate water distribution and air guide groove 15, and an opening of the air extraction perforated pipe 16 corresponds to each water distribution and air guide groove 15; after the filler fills the functional lining, the wet circulating air formed by taking away the moisture in the filling is pumped into an air extraction perforated pipe 16 through a flow guiding function of the top plate water distribution and air guide groove 15, and enters the quicklime dehydration and deodorization system through the air outlet pipe 18 to remove malodorous gas and water vapor therein to obtain dry hot air, and then enters the container from the air inlet manifold 12 at the bottom to form the circulating air to reduce the moisture content of the garbage.

The water distribution and drainage system comprises a percolate feeding pipe 19 and a fiber capillary water distribution pipe 20 (patent for invention "FIBER CAPILLARY WATER DISTRIBUTION PIPE, WATER DISTRIBUTION SYSTEM AND WATER DISTRIBUTION METHOD", application number: 2020103619748), top plate water distribution and air guide groove 15, a side drain 22, a main drain 23 and a percolate discharge pipe 24; the percolate feeding pipe 19 is arranged below the top plate water distribution and air guide groove 15 and at the other side opposite to the air extraction perforated pipe 16; the fiber capillary water distribution pipe 20 is arranged in the top plate water distribution and air guide groove 15 which is equidistantly distributed by 30 mm, and is connected to the percolate feeding pipe 19, and the percolate feeding pipe 19 uniformly distributes water from top to bottom to the filler by the fiber capillary water distribution technology. The percolate discharge pipe 24 is connected to the main drain 23, and the percolate discharge pipe 24 drains an effluent produced by the filler in the heterotopic and aerobic stabilization process by means of a guide and drain function of a water discharge and air distribution groove (side drain 22)

and a main drain 23. A mat is laid on top of the base plate loading area to prevent the load from falling into the water discharge and air distribution groove (side drain 22) and the main drain 23.

The heating and insulating system comprises a base plate hydrothermal manifold 25, a bottom hydrothermal coil 26, a peripheral hydrothermal layer 27, a bottom air insulating layer 28, and a peripheral air insulating layer 29. The peripheral hydrothermal layer 27 is formed by splicing a hydrothermal short tube (an area located at either side of the base plate 8 and connected with the side plate 6) of the base plate 8, side hydrothermal layers of the two side plates 6, and a top hydrothermal layer of the top plate 7; the hydrothermal manifold 25 is connected to the quicklime dehydration and deodorization system via a circulating water pipe 30, and the hot circulating water produced thereby is respectively sent to the bottom hydrothermal coil 26 and the peripheral hydrothermal layer 27 to supply heat for the inner lining filling, and the circulated water is sent to the quicklime dehydration and deodorization system to be warmed using the residual heat of the system. The peripheral air insulating layer 29 is formed by splicing the side air layer of the base plate 8, the side air layers of the side plates 6, and the top air layer of the top plate 7, and together with the bottom air insulating layer 28, prevents the heat inside the lining from escaping to the environment to play a thermal insulation function. In addition, a right-angle stainless steel hollow corner block is placed at a splice between the side plate and the top plate to ensure the structural strength of the splice.

The positioning and fixing system comprises side positioning squares 5 and a positioning and fixing device 3. The side positioning squares 5 are provided inside the side walls of either side of the container, and have a width and height of 50 mm, and a length of 12032 mm, which is the same as the length of the side walls, and two side positioning squares are arranged equidistantly on each side, and are connected to a stressed frame of the container for positioning the liner in the width direction inside the container, and conducting the side pressure of the liner during transportation to the stressed frame of the container via the side squares 5 to prolong a service life of the liner; the positioning and fixing device 3 is installed on the top of the container and is connected with the stressed frame of the container, and is used for positioning and fixing the top plate 7 of the lining at the height and depth inside the container to prevent the displacement caused by the uphill and downhill during transportation.

A control and maintenance area 4 is provided in an interlayer area between the rear part of the container and the functional lining back plate, and is provided with a steel platform for placing a fan 17 required by the circulating air low-temperature evaporation system; and the control and maintenance area further comprises a part of an air inlet manifold 12, a percolate feeding pipe 19, an air outlet pipe 18 and a percolate discharge pipe 24 to facilitate the connection and routine maintenance of pipelines when multiple groups of container equipment are used in combination.

A double door is mounted on a container head, and a rubber sealing ring is provided at a joint between an inner side of the door and the inner lining to play a sealing function; an access is provided at the rear of the container to facilitate operators to enter the control and maintenance area 4.

The method for using the above-mentioned container equipment for enclosed transportation and heterotopic and aerobic stabilization of reserved garbage comprises the following steps:

S1: when excavating the reserved garbage in the landfill, a side of the container equipment is raised under the action of an external force, and the excavator directly loads the excavated garbage into the container to reduce an exposure time of the excavated garbage;

S2: when the excavated garbage falling into the container fills the entire functional lining under the action of gravity, the container equipment returns to its original state, ensuring that the gate is directly sent to the heterotopic and aerobic stabilizing area after being closed, and secondary pollution control is achieved by enclosed transportation;

S3: after the container arrives at the designated area, the air inlet manifold 12, the air outlet pipe 18 and the circulating water pipe 30 are connected to the quicklime dehydration and deodorization system, the percolate feeding pipe 19 and the percolate discharge pipe 24 are connected to the percolate treatment system for the aerobic stabilization process of a single container equipment, the temperature inside the container is controlled by adjusting the circulating air and circulating water temperatures of the quicklime dehydration and deodorization system, and maintaining a suitable moisture content of the excavated garbage by adjusting the water distribution so that the temperature of the excavated garbage in the container is 25-50° C. and the moisture content is maintained at 40-50% for the aerobic stabilization process. The whole process is totally closed, which effectively avoids secondary pollution of percolate and malodorous gas.

S4: after the excavated garbage reaches an aerobic stabilization standard, the container is transported to the designated area and the tail is raised; the stabilized excavated garbage flows out by gravity; and the emptied container can be transported to the landfill to fill the newly excavated garbage. The aerobic stabilization standard is that the water content of the pile (i.e. excavated garbage sample) is less than 40%, the 4-day respiratory intensity ($AT_4$) is less than 5 mg $O_2$/g DW, and the stabilization time is generally 7 days.

The foregoing description is merely a preferred embodiment of the invention and is not to be construed as limiting the scope of the invention. It is intended that the invention be construed as including all such modifications and alterations insofar as they come within the scope of the appended claims or the equivalents thereof.

The invention claimed is:

1. A container equipment for enclosed transportation and heterotopic and aerobic stabilization of reserved garbage, wherein the equipment comprises a container body and a functional lining provided on an inner wall of the container body, and the functional lining is provided with a circulating air low-temperature evaporation system and a water distribution and drainage system;

the circulating air low-temperature evaporation system comprises an air inlet manifold, an air distribution perforated pipe, a base plate water discharge and air distribution groove and a top plate water distribution and air guide groove, an air extraction perforated pipe, a fan, an air outlet pipe and a quicklime dehydration and deodorization system; the air inlet manifold is connected to the quicklime dehydration and deodorization system, and the air distribution perforated pipe is connected to the air inlet manifold and is arranged in an equidistantly distributed base plate water discharge and air distribution groove to distribute air from bottom to top; the air extraction perforated pipe is provided below the top plate water distribution and air guide groove, is connected to an air inlet of the fan, an air outlet of the fan is connected to the air outlet pipe, and the air outlet pipe is connected to the quicklime dehydration and deodorization system;

the water distribution and drainage system comprises a percolate feeding pipe, a fiber capillary water distribution pipe, the top plate water distribution and air guide groove, a side drain, a main drain and a percolate discharge pipe; the fiber capillary water distribution pipe is arranged in the top plate water distribution and air guide groove and is connected to the percolate feeding pipe, and uniformly distributes water from top to bottom towards a filler; the side drain and the main drain located on the base plate of the functional lining are all connected to the percolate discharge pipe, and waste water is drained from the percolate discharge pipe.

2. The container equipment for enclosed transportation and heterotopic and aerobic stabilization of reserved garbage according to claim 1, wherein the functional lining further comprises a heating and insulating system comprising a base plate hydrothermal manifold, a bottom hydrothermal coil, a peripheral hydrothermal layer, a bottom air insulating layer and a peripheral air insulating layer; the peripheral hydrothermal layer comprises a hydrothermal short tube at a side of the base plate, a side hydrothermal layer at two side plates and a top hydrothermal layer at the top plate; the base plate hydrothermal manifold is connected to the quicklime dehydration and deodorization system via a circulating water pipe to respectively deliver hot circulating water produced thereby to the bottom hydrothermal coil and the abovementioned outer peripheral hydrothermal layer to supply heat for the filler inside the inner liner, and deliver the circulated water to the quicklime dehydration and deodorization system to raise the temperature with the residual heat of the system; the peripheral air insulating layer comprises a side air layer of the base plate, a side air layer of the side plates on two sides, a top air layer of the top plate, and the peripheral air insulating layer together with the bottom air insulating layer prevents the heat inside the lining from escaping.

3. The container equipment for enclosed transportation and heterotopic and aerobic stabilization of reserved garbage according to claim 2, wherein the container equipment can be piled on top of each other.

4. The container equipment for enclosed transportation and heterotopic and aerobic stabilization of reserved garbage according to claim 1, wherein the functional lining comprises a side plate, a top plate, a base plate and a back plate spliced together; the base plate is molded from waste plastic and the side plate, the top plate and the back plate are extrusion-molded.

5. The container equipment for enclosed transportation and heterotopic and aerobic stabilization of reserved garbage according to claim 1, wherein the equipment further comprises a positioning and fixing system comprising side positioning squares and a positioning and fixing device, wherein either end of the side positioning square is provided on a side wall of the container body and are of the same length as the container body, for positioning the inner lining in the width direction of the interior of the container;

the positioning and fixing device is located between the inner wall of the top of the container body and the top plate of the functional lining and is connected to a stressed frame of the container body for positioning and fixing the top plate of the functional lining at the height and depth inside the container.

6. The container equipment for enclosed transportation and heterotopic and aerobic stabilization of reserved garbage according to claim 5, wherein the positioning and fixing device comprises a winch lifting device, a steel beam and a fixed square, the height of the steel beam is a distance from the top plate of the functional lining to the top of the inner side of the container, a plurality of lower recesses are provided below the steel beam and along the length direction of the steel beam, and the lower recesses are located correspondingly to the top plate upper recesses of the functional lining; the fixed square is provided in the lower recess, and the top of the fixed square is connected to the winch lifting device inside the steel beam via a steel wire rope to achieve the lifting of the fixed square between the lower recess and the top plate upper recess; the height of the fixed square should be greater than the depth of the top plate upper recess and less than the height of the steel beam.

7. A method for using a container equipment for enclosed transportation and heterotopic and aerobic stabilization of reserved garbage, comprising:

filling the functional inner liner with the excavated garbage to ensure that the garbage is performed enclosed transportation to a heterotopic and aerobic stabilizing area with the container equipment gate being airtight;

connecting an air inlet manifold, an air outlet pipe and a base plate hydrothermal manifold to a quicklime dehydration and deodorization system, connecting a percolate feeding pipe and a percolate discharge pipe to a percolate treatment system to perform an aerobic stabilization process of a single container equipment, controlling the temperature inside the container by adjusting the circulating air and circulating water temperatures of the quicklime dehydration and deodorization system, maintaining a suitable moisture content of the excavated garbage by adjusting a water distribution speed and fully closing the whole process; and transporting the container equipment to a designated area to be emptied after the excavated garbage reach an aerobic stabilization standard, and then transporting the container equipment to a landfill to load newly excavated garbage.

8. The method according to claim 7, wherein the hot dry air supplied from the quicklime dehydration and deodorization system enters an air distribution perforated pipe through an air inlet manifold, and uniformly distributes the air from the bottom to the top toward the functional lining; after the filler fills the functional lining, the wet circulating air formed by taking away the moisture in the filling is pumped into an air extraction perforated pipe through a flow guiding function of the top plate water distribution and air guide groove, and enters the quicklime dehydration and deodorization system through the air outlet pipe to remove malodorous gas and water vapor therein to obtain dry hot air, and then enters the container from the air inlet manifold at the bottom to form the circulating air to reduce the moisture content of the garbage.

9. The method according to claim 8, wherein the percolate feeding pipe evenly distributes the inlet water from top to bottom to the filler via a fiber capillary water distribution pipe; the percolate discharge pipe drains an effluent produced by the filler in the heterotopic and aerobic stabilization process by means of a guide and drain function of a side drain and a main drain.

10. The method according to claim 7, wherein a temperature of the excavated garbage in the container equipment is 25-50° C. and a water content is kept between 40-50% for an aerobic stabilization process; the aerobic stabilization standard is that the moisture content of an excavated sample is less than 40%, a 4-day respiratory intensity $AT_4$ is less than 5 mg $O_2$/g DW, and the stabilization time is generally 3-7 days.

\* \* \* \* \*